United States Patent
Fang et al.

(10) Patent No.: US 8,373,110 B2
(45) Date of Patent: Feb. 12, 2013

(54) SYSTEM AND METHOD FOR LINEAR AND ANGULAR MEASUREMENTS OF A MOVING OBJECT

(75) Inventors: Ron Fang, Cerritos, CA (US); Toan Vu, Huntington Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 889 days.

(21) Appl. No.: 12/472,014

(22) Filed: May 26, 2009

(65) Prior Publication Data

US 2010/0302158 A1 Dec. 2, 2010

(51) Int. Cl.
G06T 7/20 (2006.01)

(52) U.S. Cl. ............. 250/231.13; 345/166; 250/231.14; 382/103

(58) Field of Classification Search ....... 250/231.13–231.18; 901/47; 382/103; 345/166
See application file for complete search history.

(56) References Cited

U.S. PATENT DOCUMENTS

| | | | |
|---|---|---|---|
| 5,288,167 A | 2/1994 | Gaffard et al. | |
| 6,172,354 B1 | 1/2001 | Adan et al. | |
| 6,236,520 B1 | 5/2001 | Weidel | |
| 7,244,925 B2 | 7/2007 | Xie | |
| 7,399,953 B2 | 7/2008 | Xie et al. | |
| 2004/0114834 A1 | 6/2004 | Fisher | |
| 2004/0227954 A1 | 11/2004 | Xie | |
| 2008/0065265 A1* | 3/2008 | Ozick et al. .......... | 700/245 |

FOREIGN PATENT DOCUMENTS

WO 0114942 3/2001

OTHER PUBLICATIONS

"ADNB-7011 and ADNB-7012 Gaming Laser Mouse Bundle Set—Data Sheet", "available at http://www.avagotech.com", May 6, 2008, pp. 1-52, Publisher: Avago Technologies Limited.
"ADNS-6010 Laser Mouse Sensor—Data Sheet", "available at http://www.avagotech.com", Jul. 7, 2008, pp. 1-41, Publisher: Avago Technologies.
Trutna, Tristan and Mark Schumacher, "Humanoids 16-264 Assignment #2: Vision", "available at http://www.contrib.andrew.cmu.edu/~ttrutna/16-264/Vision_Project", 2008, pp. 1-6, Publisher: Trutna, Tristan.
"Optical Mice and How They Work—White Paper", "available at http://www.avagotech.com", Nov. 6, 2008, Publisher: Avago Technologies.

* cited by examiner

*Primary Examiner* — Tony Ko
(74) *Attorney, Agent, or Firm* — Fogg & Powers LLC

(57) ABSTRACT

A system and method for measuring linear and angular displacement of a moving object, such as an autonomous moving object. In one embodiment, the system comprises at least one optical mouse sensor mounted adjacent to and at a predetermined distance from a surface of the autonomous moving object or a working surface. A processor on the autonomous moving object is operatively coupled to the optical mouse sensor. The optical mouse sensor outputs linear and angular displacement values to the processor during movement of the autonomous moving object to determine a direction and distance traveled by the autonomous moving object.

11 Claims, 3 Drawing Sheets

SYSTEM AND METHOD FOR LINEAR AND ANGULAR MEASUREMENTS OF A MOVING OBJECT

BACKGROUND

In some navigation and robotic applications, high resolution measurements of linear and angular displacement of a moving object are critical to the success of the applications. Optical or mechanical encoders have been commonly used in these types of applications to measure the linear or angular displacement of an object relative to another surface. However, these encoders either require special precision markings on the surface for the optical sensor or physical contact with the surface for the mechanical sensor to measure the relative changes accurately.

Because of these physical requirements, optical and mechanical encoders are often too difficult if not impossible to implement in many applications. Accordingly, there is a need for an alternative and inexpensive approach to take the place of these encoders so that the foregoing physical requirements can be eliminated.

SUMMARY

The present invention relates to a system and method for measuring linear and angular displacement of a moving object, such as an autonomous moving object. In one embodiment, the system comprises at least one optical mouse sensor mounted adjacent to and at a predetermined distance from a surface of the autonomous moving object or a working surface. A processor on the autonomous moving object is operatively coupled to the optical mouse sensor. The optical mouse sensor outputs linear and angular displacement values to the processor during movement of the autonomous moving object to determine a direction and distance traveled by the autonomous moving object.

BRIEF DESCRIPTION OF THE DRAWINGS

Features of the present invention will become apparent to those skilled in the art from the following description with reference to the drawings. Understanding that the drawings depict only typical embodiments of the invention and are not therefore to be considered limiting in scope, the invention will be described with additional specificity and detail through the use of the accompanying drawings, in which.

DETAILED DESCRIPTION

In the following detailed description, embodiments are described in sufficient detail to enable those skilled in the art to practice the invention. It is to be understood that other embodiments may be utilized without departing from the scope of the present invention. The following detailed description is, therefore, not to be taken in a limiting sense.

The present invention is directed to a system and method for high resolution linear and angular measurements using one or more optical mouse sensors. The system and method can be used to measure the linear and angular displacement of a moving object, such as an autonomous moving object, with the optical mouse sensors strategically installed on the object at a predetermined distance from a surface of the object, or near the working surface the object travels across. A processor on the autonomous moving object is operatively coupled to the optical mouse sensors.

The optical mouse sensors output linear and angular displacement values to the processor during movement of the object to determine a direction and distance traveled by the object. As an optical mouse sensor constantly compares the images it captures with previous images, the optical mouse sensor can measure and calculate its two-dimensional displacement on almost any surface it travels across without any special requirements, such as precision markings on the surface or physical contact with the surface.

In the present approach, with the use of inexpensive optical mouse sensors, the linear and angular displacement of moving objects can be measured easily and at relatively low cost in both hardware and software development.

Figure 1:
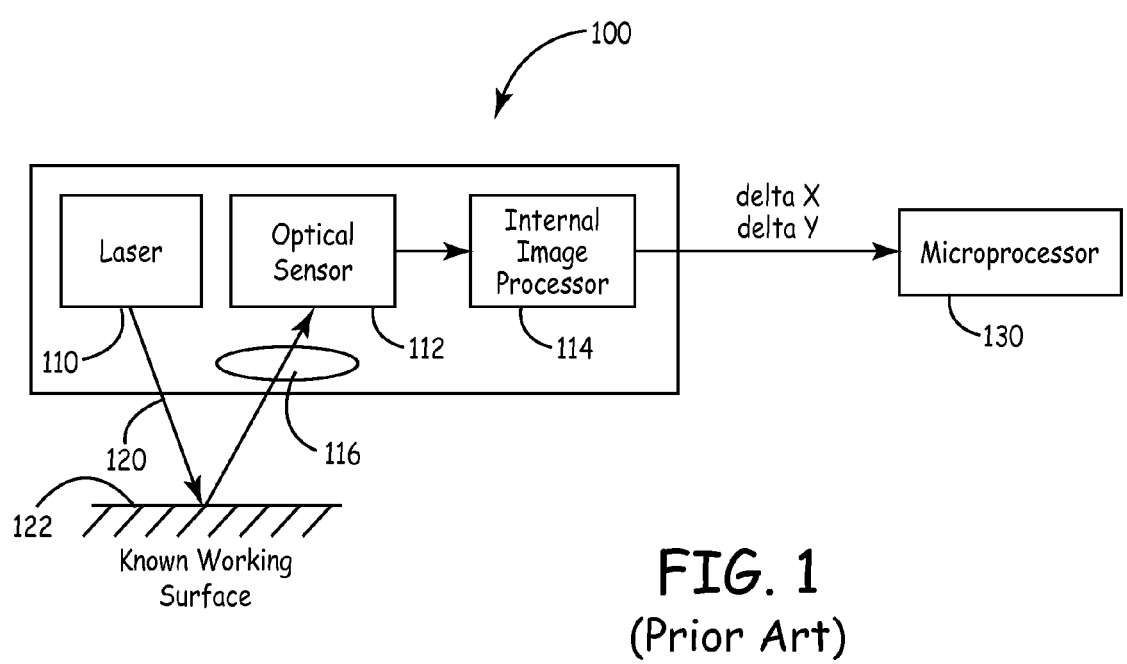
FIG. 1 is a block diagram of a conventional optical mouse sensor that can be employed in the system and method of the invention.

FIG. 1 illustrates a conventional optical mouse sensor 100 that can be employed in the present system according to one embodiment. The sensor 100 includes a light source 110 such as a laser diode, an optical image sensor 112 such as a charge-coupled device (CCD), and an internal image processor 114. The image sensor 112 is in optical communication with light source 110 through a pick-up lens 116. The lens 116 is positioned in the optical path of a light beam 120 transmitted by light source 110 and reflected from a known working surface 122 to image sensor 112. The image processor 114 is operatively coupled to image sensor 112 to receive image data, and includes an optical navigation engine for processing the image data.

The image processor 114 identifies features in the images captured by image sensor 112 as sensor 100 moves, and tracks the motion of the features by analyzing sequential images (frames). The common features between consecutive frames are identified and the distance between the common features is determined. The processor 114 calculates the delta ($\Delta$) X and delta ($\Delta$) Y changes in the current position of the features from a previous position of the features.

The changes in position are then transmitted to a microprocessor 130, which translates this information into X and Y coordinates to indicate movement of the mouse sensor. When sensor 100 is mounted to a moving object traveling at a fixed predetermined distance above known working surface 122, the linear or angular distance/speed traveled by the moving object can be measured with microprocessor 130.

In most cases, the light source and pick-up lens included with conventional mouse sensors will be sufficient for use in the present system as long as the distance between the mouse sensor and the working surface is within the focal length of the lens. If necessary, a custom light source such as a laser diode and/or lens can be implemented in the mouse sensor to improve image clarity at an increased distance from the working surface.

The present technique can be applied to various moving objects to determine the direction, distance, and speed of such objects. In general, the optical mouse sensors are implemented to either reflect light off a surface of travel or a surface of a wheel. For example, the technique can be employed in mobile robots to determine direction, distance, and speed; in automated machines in factories to determine how far the machines have traveled; or in other mobile vehicles as discussed further hereafter.

The present technique can also be applied in making angular measurements of rotatable objects. For example, the technique can be applied to rotatable antennas to determine the change in rotation and position of the antennas; and in telescopes, protractors, surveying equipment, cameras, and the like. All of the foregoing rotatable objects can be autonomous. In general, the present approach can be applied to any object that requires precise angle or rotation speed measurement.

Because of the low cost and small size of optical mouse sensors, it is relatively easy to use multiple sets of mouse sensors on a mobile object to obtain additional information. For example, with just two sets of mouse sensors located on both sides (or the rear wheels) of a robotic vehicle, it is possible to measure the vehicle's travel distance (forwards or backwards) and heading changes simply by comparing the X-Y displacements from each set of sensors.

For wheeled vehicle applications, the mouse sensor can be used to measure the rotation of a moving wheel by locating the sensor near the surface of the wheel, such as above the wheel or to the side of the wheel. The sensor detects changes on the surface of the wheel during rotation of the wheel and outputs linear and angular displacement values ($\Delta X$, $\Delta Y$) to a processor for calculating direction and distance traveled.

Figure 2:
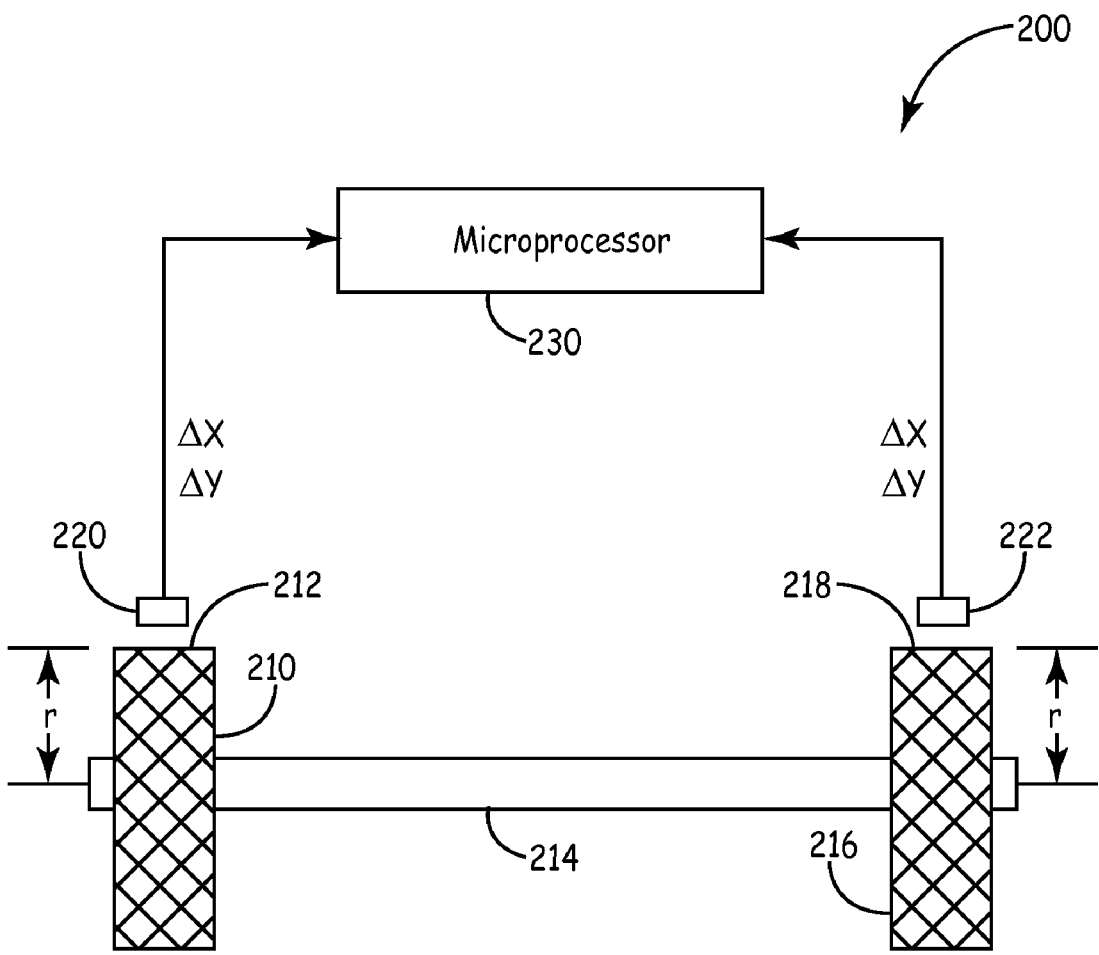
FIG. 2 illustrates a system for using optical mouse sensors as a vehicle odometer and wheel speed sensor according to one embodiment.

FIG. 2 illustrates a system 200 that employs optical mouse sensors for a mobile vehicle, which can be used for odometer and wheel speed sensors, according to one embodiment. The system 200 provides for measuring the linear and angular displacement of the mobile vehicle for determining the direction and distance traveled by the mobile vehicle. Exemplary mobile vehicles include robotic vehicles, such as unmanned ground vehicles, robotic vacuum machines, robotic lawn mowers, and the like. Other exemplary mobile vehicles include shopping carts, strollers, bicycles, street cleaners, or any other wheeled vehicles that do not move too fast for the optical sensor to work.

As shown in FIG. 2, system 200 includes a first wheel 210 having a rotatable surface 212, with wheel 210 coupled to one end of an axle 214 of the mobile vehicle. A second wheel 216 having a rotatable surface 218 is coupled to an opposite end of axle 214. A first optical mouse sensor 220 is mounted in the mobile vehicle adjacent to and at a predetermined distance from rotatable surface 212 of wheel 210. A second optical mouse sensor 222 is mounted adjacent to and at a predetermined distance from rotatable surface 218 of wheel 216. The optical mouse sensors 220, 222 are respectively mounted at about the same distance from rotatable surfaces 212, 218. A processor 230 such as a microprocessor is operatively coupled to the first and second optical mouse sensors 220, 222.

During operation of system 200, the optical mouse sensors 220, 222 respectively measure rotation of the wheels 210, 216 as the mobile vehicle is moving. The optical mouse sensors 220, 222 output linear and angular displacement values ($\Delta X$, $\Delta Y$) to processor 230 while the mobile vehicle is moving for determining the direction and distance traveled by the mobile vehicle. Assuming that the diameter of the wheels is relatively constant and the circumference of the wheel is known, the travel distance of the wheels can be easily calculated by processor 230.

For example, assuming $\Delta Y$ aligns with the traveling axes of the wheels, and $\Delta X$ is from minor misalignment of the axes of rotation of the wheels, the following parameters can be employed in the calculations of linear and angular displacement:

$\Delta X$=mouse sensor output for distance change in X-axis;
$\Delta Y$=mouse sensor output for distance change in Y-axis;
r=radius of the wheel; and
$\Delta t$=sampling period (time since last calculation).

The following values can be calculated using the foregoing parameters:

$\Delta D$=distance change=square root of ($\Delta X^2 + \Delta Y^2$); it should be noted that the sign of $\Delta Y$ determines the traveling direction (e.g., forward, backward); the distance traveled by the mobile vehicle is the average of the distance traveled by the first and second wheels;
$\Delta \theta$=angle change=$\Delta D/r$; and
$\omega$=angular velocity (rotational speed)=$\Delta \theta / \Delta t$.

Since the mouse sensors have a non-contact installation, transferring the mouse sensors from one vehicle to another vehicle can be done relatively easily compared to using other types of sensors or encoders.

One practical use of the information obtained using the mouse sensors is in dead-reckoning navigation, where relative position changes can be calculated and added to a known starting position (which must be given by another source, such as GPS or manual input) to derive the absolute position of a vehicle. Dead-reckoning navigation is commonly used as a supplement to GPS or other radio assisted navigation techniques because it can continue to calculate its own position with the on-board sensors, while other systems rely on the availability of the radio signals at all times.

Figure 3:
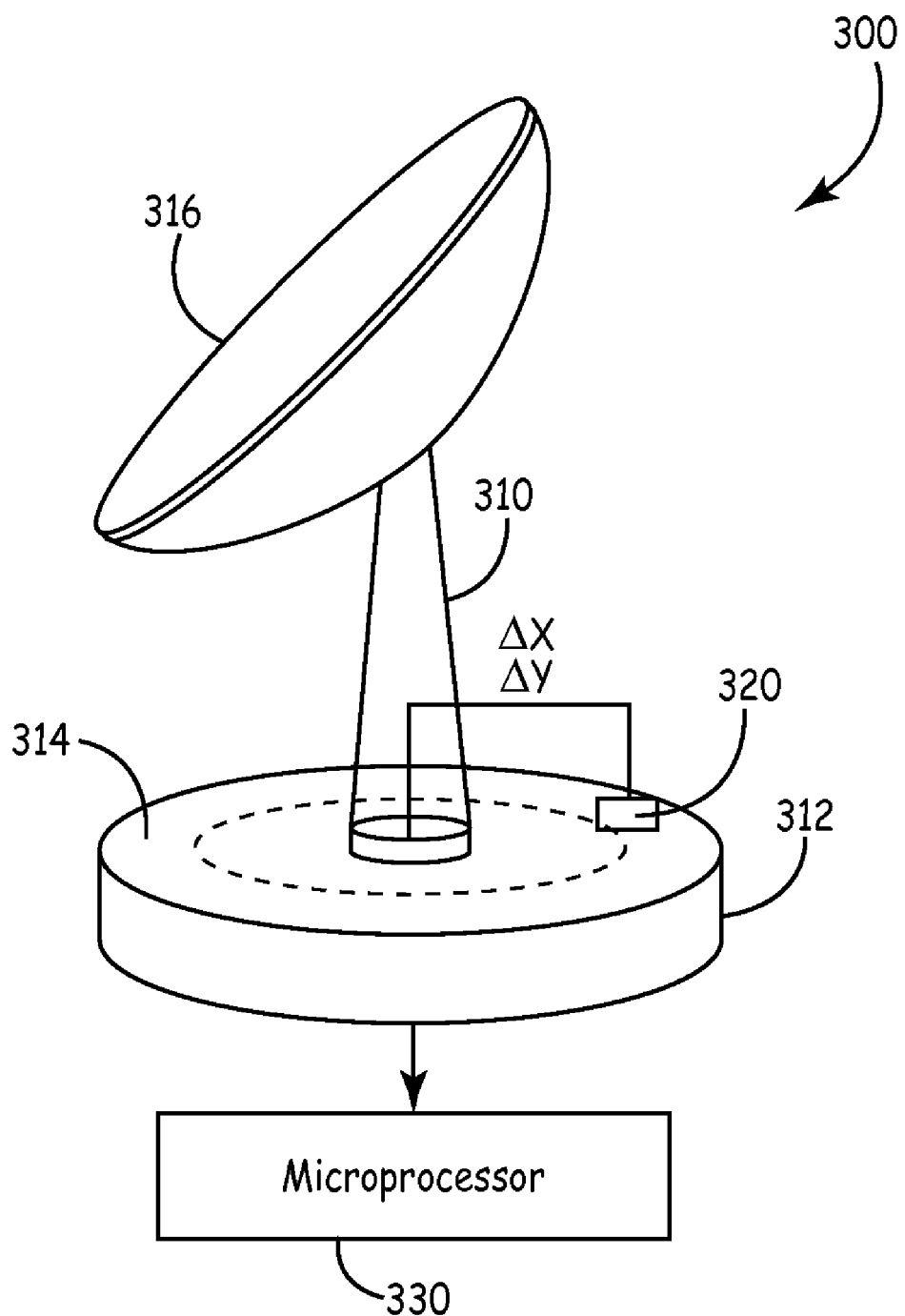
FIG. 3 illustrates a system that employs an optical mouse sensor for measuring the angular displacement of a rotatable antenna according to another embodiment.

FIG. 3 illustrates a system 300 that employs an optical mouse sensor for measuring the angular displacement of a rotatable antenna, according to another embodiment. The system 300 can be used to track the various directions that the antenna faces during operation, and determine how far the antenna has rotated.

The system 300 includes a rotatable antenna 310 mounted on a fixed base 312 having a stationary upper surface 314. The antenna 310 can be operated by a computer and typically includes a dish 316. At least one optical mouse sensor 320 is mounted on the rotatable antenna adjacent to and at a predetermined distance above upper surface 314 of base 312. A processor 330 such as a microprocessor is operatively coupled to mouse sensor 320.

During operation of system 300, mouse sensor 320 measures rotation of antenna 310 by tracking across upper surface 314 of base 312 as mouse sensor 320 moves with antenna 310. The mouse sensor 320 utilizes the images captured from the reflections off upper surface 314 to determine linear and angular displacement values ($\Delta X$, $\Delta Y$). The mouse sensor outputs these values ($\Delta X$, $\Delta Y$) to processor 330 for determining a direction that the antenna faces and how far the antenna has rotated.

For example, assuming $\Delta Y$ aligns with the traveling axis of the sensor, and $\Delta X$ is from minor misalignment of the axis of rotation of the antenna, the following parameters can be employed in the calculations of linear and angular displacement:

$\Delta X$=mouse sensor output for distance change in X-axis;
$\Delta Y$=mouse sensor output for distance change in Y-axis;
r=radius of traveling circle of the mouse sensor; and
$\Delta t$=sampling period (time since last calculation).

The following values can be calculated using the foregoing parameters:

$\Delta D$=distance change=square root of ($\Delta X^2 + \Delta Y^2$); it should be noted that the sign of $\Delta Y$ determines the traveling direction (e.g., forward, backward);
$\Delta \theta$=angle change=$\Delta D/r$; and
$\omega$=angular velocity (rotational speed)=$\Delta \theta / \Delta t$.

The processor used in the present system and method can be implemented using software, firmware, hardware, or any appropriate combination thereof, as known to one of skill in the art. By way of example and not limitation, hardware components for the processor can include one or more microprocessors, memory elements, digital signal processing elements, interface cards, or other standard processing components. Any of the foregoing may be supplemented by, or incorporated in, specially-designed application-specific integrated circuits (ASICs) or field programmable gate arrays (FPGAs). The processor also includes or functions with software programs, firmware, or other computer readable instructions for carrying out various process tasks, calculations, and control functions used in the present system and method. These instructions are typically tangibly embodied on any appropriate medium used for storage of computer readable instructions or data structures.

The present invention may be embodied in other specific forms without departing from its essential characteristics. The described embodiments are to be considered in all respects only as illustrative and not restrictive. The scope of the invention is therefore indicated by the appended claims rather than by the foregoing description. All changes that come within the meaning and range of equivalency of the claims are to be embraced within their scope.

What is claimed is:

1. A system for measuring linear and angular displacement of a mobile vehicle, the system comprising:
    a first wheel coupled to one end of an axle on the mobile vehicle, the first wheel having a rotatable surface;
    a second wheel coupled to an opposite end of the axle on the mobile vehicle, the second wheel having a rotatable surface;
    a first optical sensor mounted adjacent to and at a predetermined distance from the rotatable surface of the first wheel;
    a second optical sensor mounted adjacent to and at a predetermined distance from the rotatable surface of the second wheel;
    a processor operatively coupled to the first and second optical sensors;
    wherein the first and second optical sensors respectively measure rotation of the first and second wheels as the mobile vehicle is moving, and output linear and angular displacement values to the processor for determining a direction and distance traveled by the mobile vehicle, and a speed of the mobile vehicle.

2. The system of claim 1, wherein the first and second optical sensors are laser mouse sensors.

3. The system of claim 1, wherein the first and second optical sensors are mounted at about the same distance from the rotatable surfaces of the first and second wheels.

4. The system of claim 1, wherein the mobile vehicle is a robotic vehicle.

5. The system of claim 4, wherein the robotic vehicle comprises an unmanned ground vehicle, a robotic vacuum machine, or a robotic lawn mower.

6. The system of claim 1, wherein the mobile vehicle comprises a shopping cart, a stroller, a bicycle, or a street cleaner.

7. A method for measuring linear and angular displacement of a mobile vehicle, the method comprising:
    providing a system comprising:
        a first wheel coupled to one end of an axle on the mobile vehicle, the first wheel having a rotatable surface;
        a second wheel coupled to an opposite end of the axle on the mobile vehicle, the second wheel having a rotatable surface;
        a first optical sensor mounted adjacent to and at a predetermined distance from the rotatable surface of the first wheel;
        a second optical sensor mounted adjacent to and at a predetermined distance from the rotatable surface of the second wheel;
        a processor operatively coupled to the first and second optical sensors;
    measuring rotation of the first and second wheels as the mobile vehicle is moving using the first and second optical sensors;
    transmitting linear and angular displacement values to the processor from the first and second optical sensors as the mobile vehicle is moving;
    determining the direction and distance traveled by the mobile vehicle; and
    determining the speed of the mobile vehicle.

8. The method of claim 7, wherein the optical sensor is a laser mouse sensor.

9. The method of claim 7, wherein the mobile vehicle is a robotic vehicle.

10. The method of claim 9, wherein the robotic vehicle comprises an unmanned ground vehicle, a robotic vacuum machine, or a robotic lawn mower.

11. The method of claim 7, wherein the mobile vehicle comprises a shopping cart, a stroller, a bicycle, or a street cleaner.

* * * * *